(12) United States Patent
Perrin et al.

(10) Patent No.: US 7,802,428 B2
(45) Date of Patent: Sep. 28, 2010

(54) TURBOCHARGER SYSTEM SUBASSEMBLIES AND ASSOCIATED ASSEMBLY METHODS

(75) Inventors: Jean-Luc Perrin, Girmont (FR); Arthur Jeanson, Thaon-les-Vosges (FR); Marylene Ruffinoni, Uxegney (FR)

(73) Assignee: Honeywell International, Inc., Morristown, NJ (US)

( * ) Notice: Subject to any disclaimer, the term of this patent is extended or adjusted under 35 U.S.C. 154(b) by 519 days.

(21) Appl. No.: 11/867,501

(22) Filed: Oct. 4, 2007

(65) Prior Publication Data

US 2009/0090108 A1 Apr. 9, 2009

(51) Int. Cl.
*F02D 23/00* (2006.01)
*F02B 33/44* (2006.01)
*B21K 3/00* (2006.01)
*B23P 11/02* (2006.01)
*B23P 11/00* (2006.01)
*B23P 17/00* (2006.01)

(52) U.S. Cl. .............. 60/602; 60/605.3; 29/888.01; 29/447; 29/525.01

(58) Field of Classification Search ............. 60/602, 60/612, 605.3; 29/888.01, 447, 525.01, 525.13, 29/525.15
See application file for complete search history.

(56) References Cited

U.S. PATENT DOCUMENTS

| | | | | |
|---|---|---|---|---|
| 3,188,115 A | * | 6/1965 | Morrish et al. ............ | 285/18 |
| 3,309,123 A | * | 3/1967 | Edwards ................... | 264/80 |
| 3,496,630 A | * | 2/1970 | Van Velzor et al. ........ | 29/229 |
| 3,989,407 A | * | 11/1976 | Cunningham ............. | 415/1 |
| 4,873,127 A | * | 10/1989 | Onodera et al. ........ | 427/376.8 |
| 4,908,923 A | * | 3/1990 | Anderson et al. ........ | 29/888.01 |
| 5,390,494 A | * | 2/1995 | Clegg ..................... | 29/890.08 |
| 6,688,103 B2 | * | 2/2004 | Pleuss et al. ............. | 60/605.3 |
| 7,043,915 B2 | * | 5/2006 | Anello .................... | 60/605.3 |
| 2004/0213665 A1 | | 10/2004 | Ohishi et al. ............. | 415/151 |
| 2007/0199977 A1 | | 8/2007 | Pollard et al. ............ | 228/101 |
| 2009/0129853 A1 | * | 5/2009 | Pionetti ................... | 29/428 |

FOREIGN PATENT DOCUMENTS

RU 2272983 C1 * 3/2006

OTHER PUBLICATIONS

PCT ISR-WO (Honeywell), (PCT/IB2008/003904, Date of actual completion and mailing of the international search report on Oct. 9, 2009).

* cited by examiner

*Primary Examiner*—Thai Ba Trieu
(74) *Attorney, Agent, or Firm*—Alston & Bird LLP

(57) ABSTRACT

A subassembly of a system including an exhaust gas turbocharger system coupled with an internal combustion engine exhaust system, includes first and second components secured to each other, wherein the components are heated to an operational temperature by engine exhaust gases during engine operation. The components are secured to each other by or with a "low-melt material" whose melting temperature is less than the operational temperature, such that the low-melt material melts or at least loses its securing and/or positioning functionality upon operation of the engine and turbocharger system, and thus no longer performs any fastening or positioning function for the components. In some embodiments, temporary fasteners made of or including the low-melt material are employed for temporarily securing and positioning the components.

20 Claims, 6 Drawing Sheets

TURBOCHARGER SYSTEM SUBASSEMBLIES AND ASSOCIATED ASSEMBLY METHODS

BACKGROUND OF THE INVENTION

The present disclosure relates generally to turbocharger systems for internal combustion engines. The disclosure relates more particularly to methods for assembling together components of a turbocharger system, and to various subassemblies of a turbocharger system.

Exhaust gas-driven turbochargers are commonly employed for boosting the performance of internal combustion engines. A typical turbocharger includes a compressor having a compressor housing containing a compressor wheel, a turbine having a turbine housing containing a turbine wheel, and a shaft connecting the turbine wheel to the compressor wheel. The shaft is supported in bearings housed in a center housing that is bolted to both the compressor housing and the turbine housing.

Typically, the exhaust gases discharged from the cylinders of the engine are collected in an exhaust manifold that leads to an exhaust pipe, and the exhaust pipe is coupled with one or more turbochargers for delivering exhaust gases to the turbine (s) of the turbocharger(s). When there are multiple turbochargers, various arrangements including serial, parallel, serial-sequential, etc., have been proposed. In some cases, a valve is arranged between the exhaust manifold and one of the turbochargers for selectively allowing or preventing flow of exhaust gases. The valve typically has a housing bolted to the exhaust manifold and to the turbine housing of a turbocharger.

In these types of turbocharger/engine systems, there are various subassemblies of components that typically are pre-assembled. For example, in the case of the valve described above, the valve can be preassembled with the exhaust manifold to form a subassembly, and subsequently a turbine housing of a turbocharger can be bolted to the exhaust manifold using bolts that pass through holes in a housing of the valve and into holes in the manifold. Alternatively, the valve can be preassembled with the turbine housing, and that subassembly then can be assembled with the manifold and other components of the system. As another example, during assembly of a turbocharger, the center housing can be preassembled with the compressor housing or with the turbine housing, and/or a variable-nozzle mechanism can be preassembled with the center housing. In such preassembly operations, the components of the subassemblies are placed in predetermined positions with respect to each other and are secured in such positions with suitable fasteners such as metal screws, metal pins, metal clips, or the like.

BRIEF SUMMARY OF THE DISCLOSURE

The present disclosure is directed toward methods for pre-assembling or assembling together components in an engine/turbocharger system, and toward subassemblies of such a system. In accordance with one aspect, the present disclosure describes a subassembly of a system including an exhaust gas turbocharger system coupled with an internal combustion engine exhaust system. The subassembly comprises first and second components secured to each other, wherein the components are heated to an operational temperature by engine exhaust gases during engine operation. The components are secured to each other by or with a "low-melt material", i.e., a material whose melting temperature is less than the operational temperature, such that the low-melt material melts or at least loses its securing and/or positioning functionality upon operation of the engine and turbocharger system, and thus no longer performs any fastening or positioning function for the components. In some embodiments, temporary fasteners made of or including the low-melt material are employed for temporarily securing and positioning the components.

In some embodiments, the temporary fasteners can comprise threaded fasteners such as bolts or screws. Alternatively, other types of fasteners can be used, such as tree fasteners (also known as fir tree or Christmas tree fasteners) having split portions or "wings" that resiliently expand upon emerging through a back side of a hole into which they are inserted, clips, pins, dowels, etc. The specific type of fastener is not of particular importance, as long as the fastener is able to lose its fastening and positioning capabilities upon melting of the low-melt material as noted above.

The temporary fasteners can be constructed of or include any material that will melt when raised to the operational temperature. In some embodiments, the low-melt material is electrically insulative, so that potential dripping of the melted material onto electrical wires or components will not cause short-circuits or the like. In other cases, insulative materials may not be required. Insulative and non-insulative low-melt materials useful for construction of the temporary fasteners can include thermoplastic polymers, low-melt metals (e.g., bismuth, antimony, tin, cadmium, lead, indium, and alloys of two or more such metals), low-melt glass (i.e., glass to which selenium, thallium, arsenic, or sulfur is added to give melting points of 127-349° C., or 260-660° F.), and others. In general, the melting point or liquidus temperature of the material can be in the range of about 120° C. to about 500° C.

In one embodiment, the first component of the subassembly comprises an exhaust manifold that receives exhaust gases from the engine cylinders, the exhaust manifold defining an exit passage for the exhaust gases. The second component comprises a valve assembly mounted on the exhaust manifold, the valve assembly including a valve housing that defines a valve passage in fluid communication with the exit passage of the exhaust manifold. The valve can comprise a butterfly valve, for example.

In another embodiment, the subassembly of the manifold and valve assembly is in combination with a turbocharger having a turbine housing. The turbine housing is affixed to the valve housing and the exhaust manifold such that the valve housing is disposed between a surface of the turbine housing and a surface of the exhaust manifold. The valve housing defines holes therethrough, the turbine housing defines corresponding holes therethrough, and the exhaust manifold defines corresponding holes therein. The turbine housing and valve housing are affixed to the exhaust manifold by bolts passing through the holes in the turbine housing and through the holes in the valve housing into the holes in the exhaust manifold.

In another aspect, the present disclosure describes a method for assembling components of a system that includes an exhaust gas turbocharger system coupled with an internal combustion engine exhaust system. The method comprises the step of securing first and second components of the system to each other by temporary fasteners comprising a low-melt material whose melting temperature is less than an operational temperature to which the components are heated by engine exhaust gases during engine operation. The method can include the additional step of permanently affixing the first and second components to each other by a high-melt material having a melting point temperature substantially higher than the operational temperature. For example, the permanently affixing step can comprise engaging threads on one or more permanent fasteners made of the high-melt material with corresponding threads defined by at least one of the first and second components. Alternatively, the permanently affixing step can comprise forming one or more metallurgical bonds between the first and second components using the high-melt material.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Throughout the present specification and claims, the term "fastener" is expansive and includes any device or article that performs either or both of (1) an affixing function to hold two or more components together so they do not become separated, and (2) a positioning or locating function to position two or more components in desired or predetermined relative positions with respect to one another. Such devices or articles can include, but are not limited to, threaded screws, threaded bolts, pins, dowels, clips, clamps, rivets, strings or wires, ties, etc. In addition, fasteners in accordance with the invention can comprise metallurgical bonds such as solder joints or weld joints between components.

Figure 1:
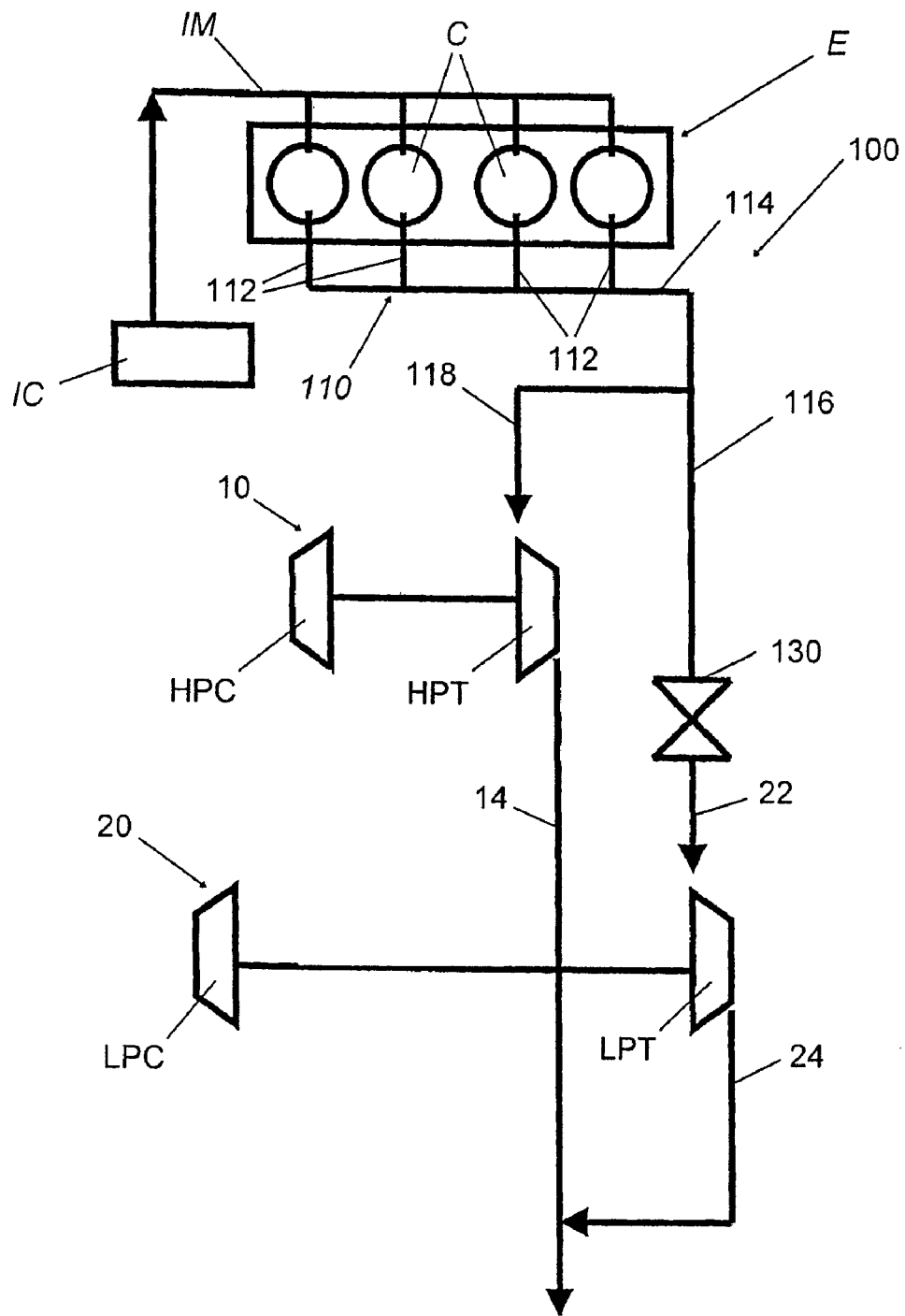
FIG. 1 is a diagrammatic view of an engine/turbocharger system in accordance with one embodiment of the invention.

An engine/turbocharger system in accordance with one embodiment of the invention is schematically illustrated in FIG. 1. The system includes an internal combustion engine E, and an exhaust/turbocharger system 100. The cylinders C of the internal combustion engine E receive combustion air via an intake manifold IM. The combustion air can be cooled in an intercooler IC prior to being supplied to the intake manifold, if desired. The cylinders also receive fuel, either mixed with the combustion air prior to the intake manifold or separately injected into the cylinders by fuel injectors (not shown), and the fuel-air mixture is combusted in the cylinders, producing exhaust gases that are discharged from the cylinders into one or more exhaust manifolds 110 of the exhaust/turbocharger system. The manifold defines a separate exhaust gas conduit 112 for each engine cylinder. The conduits 112 merge into a common pipe 114 of the manifold. The manifold also defines (at least in part) an exhaust pipe 116 through which exhaust gas is discharged from the common pipe 114 of the manifold.

The stream of exhaust gas from the exhaust manifold 110 drives a high-pressure (HP) turbocharger 10 and a low-pressure (LP) turbocharger 20. The HP turbocharger 10 includes an HP turbine HPT and an HP compressor HPC connected to each other by a shaft such that rotation of the HP turbine causes the shaft to rotate, which in turn causes the HP compressor to rotate and to compress a stream of air supplied to it for delivery to the intake manifold IM of the engine. Likewise, the LP turbocharger 20 includes an LP turbine LPT and an LP compressor LPC connected to each other by a shaft such that rotation of the LP turbine causes the shaft to rotate, which in turn causes the LP compressor to rotate and to compress a stream of air supplied to it for delivery to the intake manifold IM of the engine. FIG. 1 depicts only the exhaust gas side of the turbocharger system, but it will be understood that there is a system of air conduits for supplying air to each compressor, and for feeding air compressed by the compressors to the intake manifold (or optionally to the intercooler IC, from which the air is then supplied to the intake manifold).

The turbine side of the system includes the main exhaust pipe 116 that carries exhaust gas from the exhaust manifold 110, and an HP branch pipe 118 that branches off from the main exhaust pipe 116 and supplies exhaust gas to the HP turbine HPT. Exhaust gas that has passed through the HP turbine is discharged through a first turbine discharge line 14. If desired, a bypass line (not shown) can be connected between the HP branch pipe 118 upstream of the HP turbine and the discharge line 14 downstream of the HP turbine for bypassing exhaust gas around the HP turbine whenever a bypass valve (not shown) arranged in the bypass line is open.

Exhaust gas carried in the exhaust pipe 116 that does not pass through the HP branch pipe 118 is carried through a flow control valve 130 to an LP turbine inlet pipe 22 that supplies the gas to the LP turbine LPT. Exhaust gas that has passed through the LP turbine is discharged through an LP turbine discharge line 24. A bypass line (not shown) can be connected between the LP turbine inlet pipe 22 upstream of the LP turbine and the discharge line 24 downstream of the LP turbine for bypassing exhaust gas around the LP turbine whenever a bypass valve (not shown) arranged in the bypass line is open.

The present invention is particularly concerned with the manner in which the flow control valve 130 is assembled with the exhaust manifold 110. More generally, the present invention is concerned with the manner in which two (or more) components of a subassembly in an engine/turbocharger system are assembled with each other. In various contexts in such a system, two or more components are initially assembled together to form a subassembly, and subsequently the subassembly is incorporated into a larger assembly. Thus, it is necessary to secure the components together in predetermined positions with respect to each other via fasteners or mechanisms to form the subassembly. However, in some cases, the incorporation of the subassembly into the larger assembly results in the components being secured together via additional fasteners or mechanisms that render the initial fasteners or mechanisms superfluous and even undesired. The present invention addresses this issue.

Figure 2:
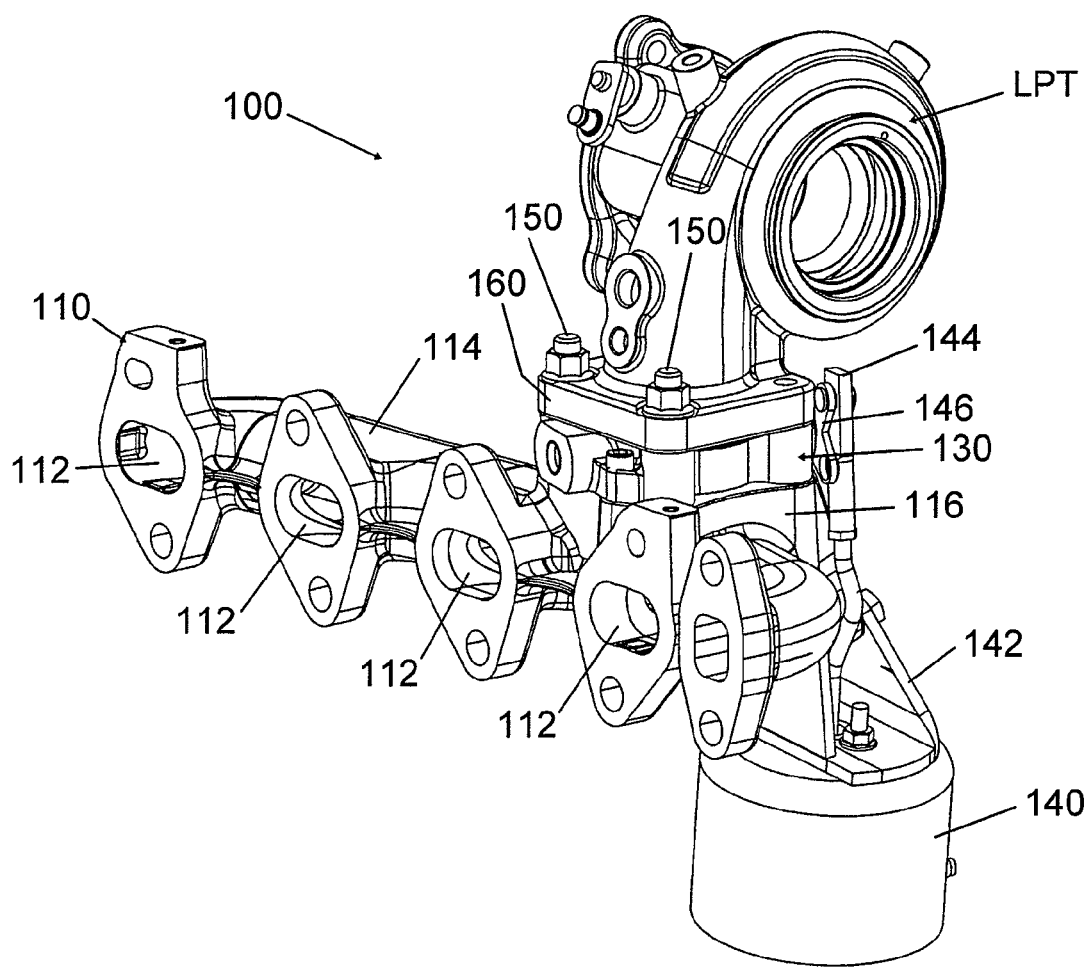
FIG. 2 is an isometric view of an engine exhaust/turbocharger system in accordance with one embodiment of the invention.
Figure 3:
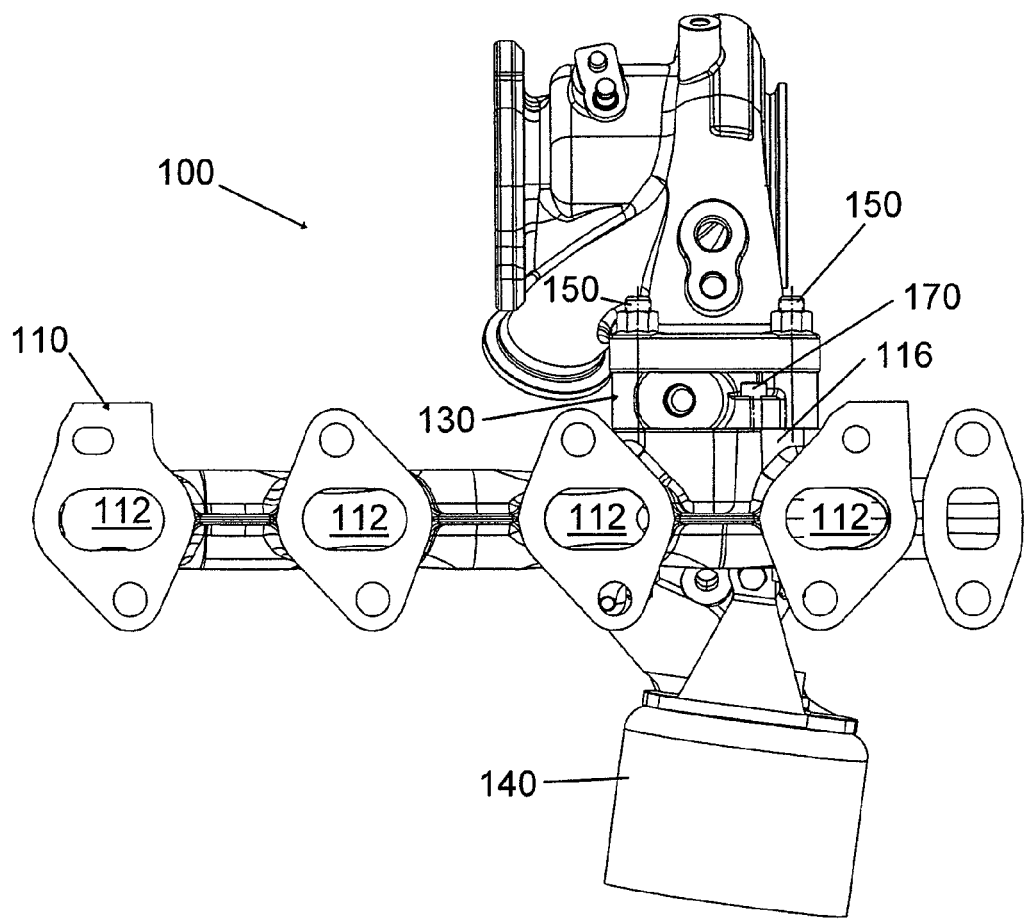
FIG. 3 is a front elevation of a subassembly of the system, in accordance with one embodiment of the invention.
Figure 4:
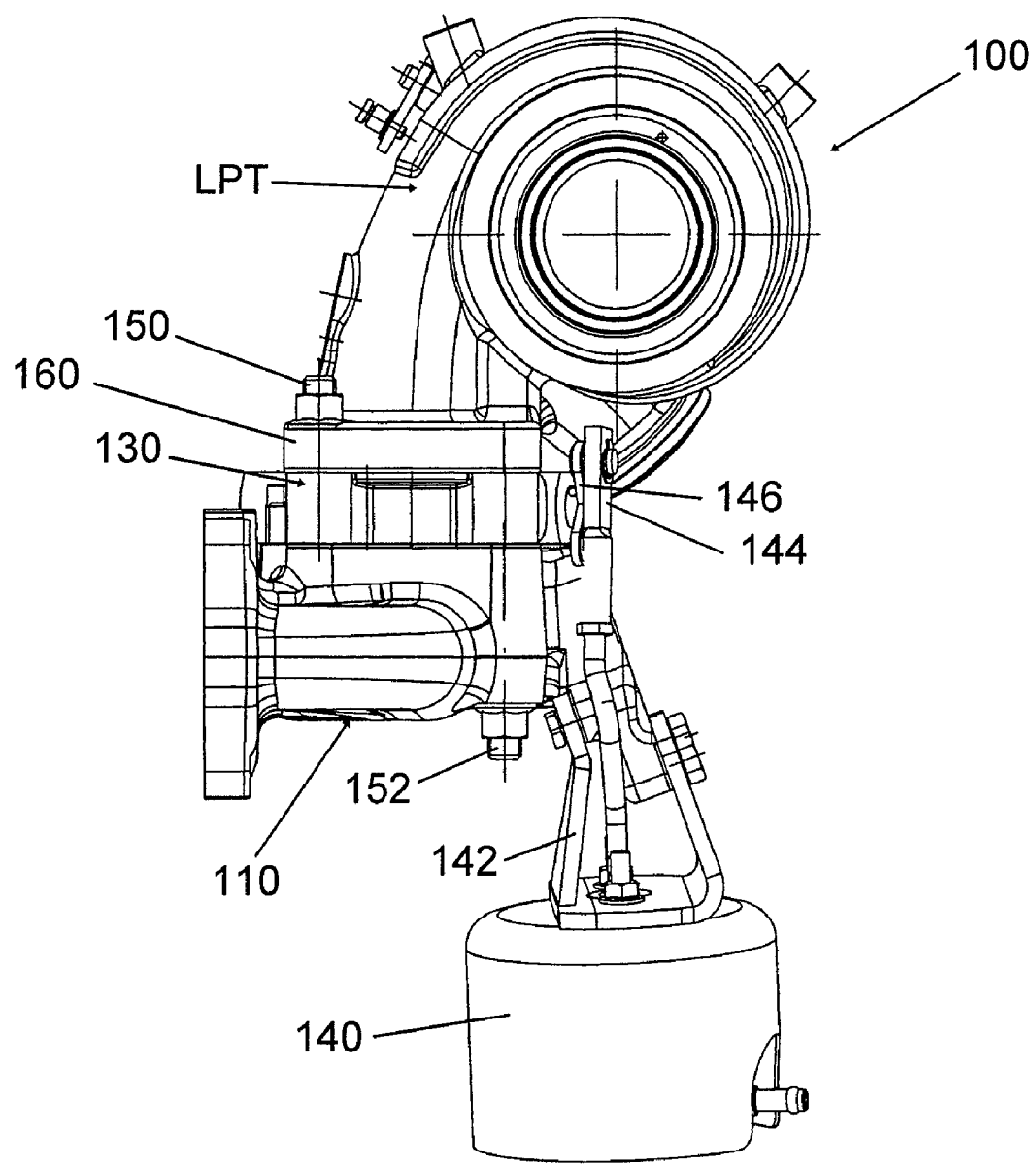
FIG. 4 is a side elevation of the subassembly.

The present invention is now explained by reference to a specific illustrative example, but it will be understood that the invention is more generally applicable to the assembly of two or more components of various types, and additional (examples are cited but not illustrated) at the end of this specification. An engine exhaust/turbocharger system 100 in accordance with one embodiment of the invention is illustrated in FIGS. 2-4. The system includes an exhaust manifold 110 that receives exhaust gas from the various cylinders of an internal combustion engine via individual exhaust gas conduits 112 defined by the manifold, as previously noted. The conduits 112 merge into a common pipe 114 of the manifold. The pipe 114 leads to an exhaust pipe 116 through which the exhaust gas in the common pipe 114 is supplied to the turbocharger system. An HP branch pipe 118 (FIG. 6) branches off from the exhaust pipe 116 for supplying exhaust gas to the HP turbine. The HP branch pipe includes a flange 120 for connection to a corresponding flange of the turbine housing of the HP turbine. Downstream of the point where the HP branch pipe branches off from the exhaust pipe 116, a flow control valve 130 is connected to the exhaust pipe. The valve 130 can be selectively opened or closed. When the valve is closed, substantially all of the exhaust gas flowing through the exhaust pipe 116 is routed through the HP branch pipe 118 to the HP turbine, as previously described in connection with FIG. 1.

Figure 5:
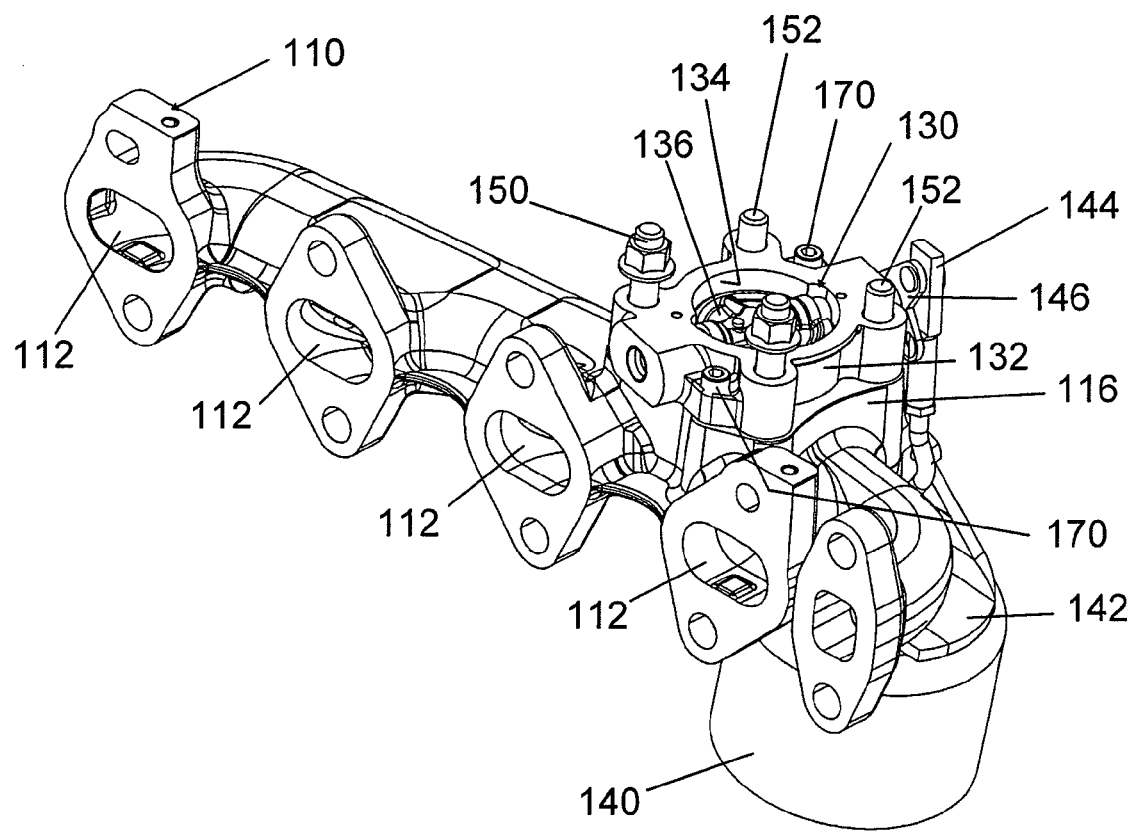
FIG. 5 is an isometric view of the subassembly.
Figure 6:
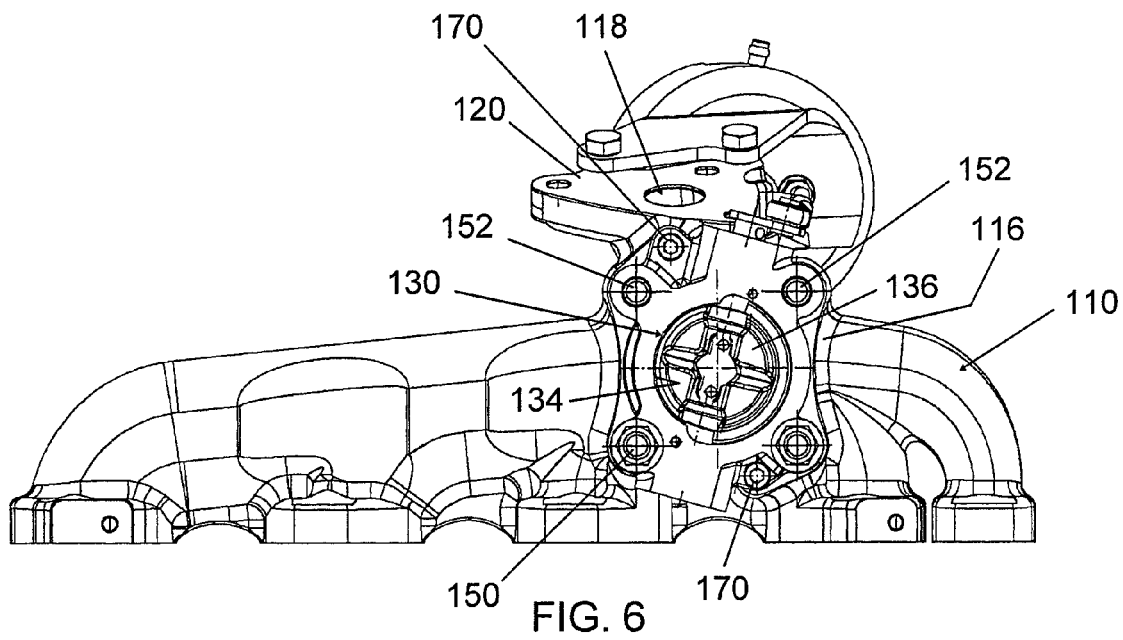
FIG. 6 is a top elevation of the subassembly.

With particular reference to FIGS. 5 and 6, the valve 130 includes a valve housing 132 defining a valve passage 134 therethrough for passage of exhaust gas when the valve is open. The particular valve as illustrated is a butterfly valve having a butterfly flap 136 disposed in the passage 134 and affixed to a shaft that is pivotally journaled in the valve housing 132; more generally, a valve in accordance with this embodiment can have any of various types of movable valve members. The shaft of the butterfly flap is pivoted by an actuator 140 such as a pneumatic actuator or any other suitable type of actuator. The actuator is mounted on the exhaust manifold 110 by a suitable bracket 142, and has an output shaft or rod 144 coupled to a lever arm 146 that in turn is connected to the shaft of the butterfly flap. Extension of the rod 144 pivots the lever arm 146 and thus the butterfly flap in one direction, and retraction of the rod pivots the butterfly flap in the opposite direction, so as to open and close the valve.

During final assembly of the turbocharger system with the engine exhaust manifold 110, the valve housing 132 is mounted on the exhaust manifold by threaded bolts 150 and 152, which also serve to mount the housing of the LP turbine to the valve housing and manifold. The valve housing is disposed between a surface of the turbine housing and a surface of the exhaust manifold. More particularly, as best seen in FIG. 4, the bolts 150 pass through holes in a flange 160 of the LP turbine housing, through holes in the valve housing 132, and through holes in the manifold 110, with enlarged heads of the bolts 150 engaging a surface of the LP turbine housing flange, and threads of the bolts 150 engaging corresponding threads in the holes of the manifold. The bolts 152 similarly pass through holes in the manifold 110, through holes in the valve housing 132, and through holes in the LP turbine housing flange 160, with enlarged heads of the bolts 152 engaging a surface of the manifold 110, and threads of the bolts 152 engaging corresponding threads in the holes of the LP turbine housing flange 160.

Prior to the final assembly of the exhaust/turbocharger system 100, however, it is necessary to initially mount the valve 130 and its actuator 140 on the manifold 110 (or, alternatively, on the LP turbine housing) and calibrate the valve's operation. For this purpose, prior to the present invention, the practice of the present applicant was to mount the valve with two small metal bolts. The small metal bolts were adequate for positioning the valve in the proper position for valve calibration purposes, but were not suitable or intended for permanent fastening of the valve to the manifold. While this approach was satisfactory from a valve calibration standpoint, the end result in the final assembly was that six bolts in total secured the valve to the manifold. This was undesirable because it resulted in a "hyperstatic" assembly in which the two small metal bolts were not necessary for securing the valve to the manifold, but contributed to added rigidity of the valve housing in an undesirable way, particularly when the parts underwent thermal expansion.

In accordance with the present invention, initial assembly of the valve 130 with the manifold 110 (or, alternatively, with the LP turbine housing) is accomplished with one or more temporary fasteners made of or including a low-melt material whose melting temperature (i.e., liquidus temperature) is lower than the temperature to which the components are heated by engine exhaust gas during operation (the latter temperature being referred to herein as the "operational temperature"). In a typical engine/turbocharger system, components exposed to or affected by engine exhaust gases are heated to a temperature of at least about 150° C., particularly at least about 250° C., more particularly at least about 400° C., still more particularly at least about 500° C., and typically at least about 600° C. Such temperatures are well below the melting temperature of typical metal fasteners such as the small metal bolts previously employed for pre-assembling the valve with the manifold. In accordance with the present invention, however, the securing and/or positioning function (s) of the temporary fastener(s) cease when the low-melt material of the fastener(s) is heated by exhaust gases. The low-melt material has a melting temperature in the range of about 120° C. to about 500° C., the material being selected such that its melting temperature is less than the operational temperature to which the components secured by the temporary fastener(s) are heated during engine operation.

In one embodiment such as shown in FIGS. 2-6, the temporary fasteners comprise threaded fasteners such as bolts 170 that pass through holes in the valve housing 132 into holes in the manifold 110. The bolts 170 can be made of or include any of various low-melt materials, including but not limited to thermoplastic polymers, low-melt metals (e.g., bismuth, antimony, tin, cadmium, lead, indium, and alloys of two or more such metals), low-melt glass (i.e., glass to which selenium, thallium, arsenic, or sulfur is added to give melting points of 127-349° C., or 260-660° F.), and others. In some embodiments, the temporary fasteners can be formed exclusively of the low-melt material such that the entire structure of each fastener melts when heated above the melting temperature of the low-melt material. In other embodiments, a portion of each temporary fastener can be formed of the low-melt material such that melting of the material causes the fastener to lose its fastening functionality.

In the illustrated embodiment, after the valve 130 is temporarily secured to the exhaust manifold 110 (or, alternatively, to the LP turbine housing) by the temporary bolts 170, the valve is calibrated. The subassembly of the manifold 110 and valve 130 (plus the valve actuator 140 and associated parts) can be shipped to the end user for incorporation into an engine/turbocharger system such as the system diagrammatically shown in FIG. 1. At final assembly, the LP turbine is bolted to the valve and the manifold using the bolts 150, 152 as previously described. Upon operation of the engine/turbocharger system, when the valve housing 132 is heated to the operational temperature, the low-melt material of the bolts 170 melts such that the bolts no longer perform any fastening or positioning function for the valve housing. Thereafter, only the permanent bolts 150, 152 perform the fastening and positioning functions.

As previously noted, the concept of the invention can be applied to the fastening and positioning of various components of an engine exhaust/turbocharger system. For example, during assembly of a turbocharger, it is often necessary to secure the center housing to the turbine housing, or to position the compressor housing relative to the center housing, prior to final assembly of the turbocharger. Temporary fasteners in accordance with the invention can be used in such situations. As also noted above, fasteners in accordance with the invention can comprise not only fasteners in the traditional sense, but also metallurgical bonds such as solder joints or weld joints formed between the components by or with low-melt material.

The permanent fastening of the components to each other can also be accomplished not only by fasteners, but also by metallurgical bonds such as solder joints or weld joints formed between the components by or with a high-melt material.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for assembling first and second components of a system that includes an exhaust gas turbocharger system coupled with an internal combustion engine exhaust system, wherein the components are heated to an operational temperature by heat transfer from engine exhaust gases during engine operation, the method comprising the step of:

securing the first and second components of the system in predetermined positions relative to each other using a low-melt material whose melting temperature is less than said operational temperature.

2. The method of claim 1, wherein the securing step employs temporary fasteners comprising the low-melt material.

3. The method of claim 2, further comprising the step of operating the engine and exhaust gas turbocharger system so as to heat the components at least to said operational temperature and thereby cause the low-melt material to melt whereupon the temporary fasteners no longer perform any fastening or positioning function for the components.

4. The method of claim 1, further comprising the step, performed after the securing step, of permanently affixing the first and second components to each other by a high-melt material having a melting point temperature substantially higher than said operational temperature.

5. The method of claim 4, wherein the permanently affixing step comprises engaging threads on one or more permanent fasteners with corresponding threads defined by at least one of the first and second components, the permanent fastener(s) being made of the high-melt material.

6. The method of claim 4, wherein the permanently affixing step comprises forming one or more metallurgical bonds between the first and second components, the bond(s) being made with the high-melt material.

7. A subassembly of a system that includes an exhaust gas turbocharger system coupled with an internal combustion engine exhaust system, the subassembly comprising:

first and second components that are heated to an operational temperature by heat transfer from engine exhaust gases during engine operation, the first and second components being secured in predetermined positions relative to each other by a low-melt material whose melting temperature is less than said operational temperature such that the low-melt material melts upon operation of the engine and turbocharger system and no longer performs any fastening or positioning function for the components.

8. The subassembly of claim 7, wherein the first and second components are secured to each other by temporary fasteners comprising the low-melt material.

9. The subassembly of claim 8, wherein the first component comprises an exhaust manifold that receives exhaust gases from the engine, the exhaust manifold defining an exit passage for the exhaust gases, and the second component comprises a valve assembly mounted on the exhaust manifold, the valve assembly including a valve housing that defines a valve passage in fluid communication with the exit passage of the exhaust manifold.

10. The subassembly of claim 9, in combination with a turbocharger having a turbine housing, the turbine housing being affixed to the valve housing and the exhaust manifold such that the valve housing is disposed between a surface of the turbine housing and a surface of the exhaust manifold.

11. The subassembly of claim 10, wherein the valve housing defines holes, the turbine housing defines corresponding holes, and the exhaust manifold defines corresponding holes therein, and the turbine housing and valve housing are affixed to the exhaust manifold by bolts passing through the holes in the turbine housing, through the holes in the valve housing, and through the holes in the exhaust manifold.

12. The subassembly of claim 8, wherein the temporary fasteners comprise tree fasteners.

13. The subassembly of claim 8, wherein the temporary fasteners comprise locating pins.

14. The subassembly of claim 7, wherein the low-melt material has a melting temperature from about 120° C. to about 500° C.

15. The subassembly of claim 7, wherein the low-melt material is a thermoplastic polymer.

16. The subassembly of claim 7, wherein the low-melt material is electrically insulative.

17. The subassembly of claim 7, wherein the low-melt material is a low-melt metal.

18. The subassembly of claim 7, wherein the low-melt material is a low-melt glass.

19. The subassembly of claim 7, wherein the first component comprises a center housing of the turbocharger system and the second component comprises a turbine housing of the turbocharger system.

20. The subassembly of claim 7, wherein the temporary fasteners comprise threaded fasteners.

* * * * *